3,150,096
CLEANSING AND SANITIZING COMPOSITIONS FOR FOOD HANDLING EQUIPMENT
William Schmidt, Flushing, Melville G. Sutton, Kew Gardens, and Carl M. Citron, New York, N.Y., assignors to West Laboratories, Inc., Long Island City, N.Y., a corporation of New York
No Drawing. Filed Mar. 27, 1961, Ser. No. 98,303
3 Claims. (Cl. 252—106)

This invention relates to compositions for cleansing and sanitizing food handling equipment, including in particular, pipeline milking equipment and other varied equipment, including stainless steel, glass, plastic and/or rubber parts. More particularly, the invention relates to compositions having unique low foaming properties particularly adapting them for use in connection with piepline milking machines and other equipment of a cleaned in place (C.I.P.) nature.

Heretofore considerable difficulty has been experienced in properly cleaning and sanitizing C.I.P. installations. Most cleaning and sanitizing systems consist of an alkaline cleaner, a chlorinated cleaner, an organic acid, and a liquid sodium hypochlorite. Typical procedures for properly cleaning and sanitizing equipment such as a pipeline milker utilize these materials as follows: (Step 1) Flush the system thoroughly with warm water (100° F.) immediately after milking. (Step 2) Wash the system 20 minutes with a solution of an alkaline cleaner and liquid sodium hypochlorite. (Step 3) Rinse thoroughly with hot water (145° F.) followed by an organic acid cleaning solution at about 160° F. (Step 4) Sanitize the system just before milking with a solution of sodium hypochlorite in cool water.

An object of the present invention is to provide a composition for cleaning and sanitizing pipeline milking equipment and other C.I.P. food handling equipment which is not affected by hard water or by cold water, and which can be utilized at different concentrations both as a cleaner and sanitizer, and as a simple sanitizing rinse. A further object of the invention being to provide a cleaning and sanitizing composition which in use, provides a substantial saving in time and additional savings in operating costs through lower operating temperatures, less inventory of materials, and less chance of error in the use thereof.

While the theoretical desirability of a one-product system for the cleaning and sanitizing of pipeline milking equipment and other C.I.P. equipment has long been appreciated, attempts to provide such a system have heretofore been unsuccessful due to the problem of foaming which results not only in improper cleaning and sanitizing of pipelines and other component parts, but also results in the malfunctioning of and/or damage to pumping equipment.

A major problem in the formulating of a satisfactory low foam product has been the inadequacy of standard foam test methods in evaluating extremely low foaming solution. It has been found, for example, that formulations which are described as low foaming and which test out as low foaming by current standards, actually foam so extensively in C.I.P. installations as to preclude their use.

In order to better correlate laboratory test results with field results in C.I.P. installations, a special "dynamic" foam test method for measuring low foaming (or substantially non-foaming) products has been devised. The procedure for this dynamic test method is as follows:

150 ml. of the solution to be tested is placed in a 500 ml. calibrated gas washing bottle with fritted cylinder. Using an air flow meter, the air flow is adjusted to 2 liters per minute and the foam height is read after equilibrium has been established at a temperature of 25° C.

The results obtained by this "dynamic" continuous flow method have been found to correlate well with those obtained in C.I.P. installations making possible a reasonable degree of accuracy in predicting behavior of various formulations by laboratory tests in advance of actual field tests. It has been found, for example, that the formulation, if it is to be satisfactory from a foaming standpoint for the cleaning of C.I.P. equipment, must, by the test procedure above described, show a foam volume not greater than 125 ml.

It has been discovered in accordance with the present invention that products possessing high cleaning and sanitizing efficiency and having remarkably low foaming properties can be obtained by incorporating iodine together with a source of iodide, such as HI, or an alkali metal iodide in an aqueous medium containing as surface active agents, a mixture of sodium polymethacrylate and sodium xylene sulfonate and acidified with citric and phosphoric acids. The relative proportions of the several components appear to be quite critical, although the overall concentration of active components can be varied considerably, depending upon the strength or activity desired in a product for distribution and sale and the intended dilution in preparing for use solutions thereof. It has been found for example, that the several components should be combined in approximately the following proportions expressed in parts by weight:

| | Parts |
|---|---|
| Phosphoric acid | 10–33 |
| Citric acid | 2–12 |
| Sodium polymethacrylate (molecular weight 850–42000) | 1.5–8 |
| Sodium xylene sulfonate | 1–6 |
| Iodine | 0.5–3.0 |
| Hydriodic acid | 0.5–3.0 |
| Water | 84.5–35 |

The iodine in the formulations is solubilized in part by the two surface active agents and in part by the hydriodic acid, it being understood that the same amount of iodide ($I^-$) can be supplied by an alkali metal iodide if desired. At intended use dilution of about 25 p.p.m. of iodine for cleaning and sanitizing operations and about 12.5 p.p.m. of iodine when used as a sanitizing rinse, the iodine imparts an amber color to the use dilution, providing a visual indication of the presence of germicidal activity.

The following example will provide a better understanding of the low foaming cleaning and sanitizing composition in accordance with the present invention, but it is to be understood that this example is given by way of illustration and not of limitation:

*Example*

A low foam cleaner and sanitizer composition is prepared containing by weight:

| | Percent |
|---|---|
| Phosphoric acid | 30.00 |
| Citric acid | 6.00 |
| Sodium polymethacrylate (molecular weight approx. 20000) | 4.2 |
| Sodium xylene sulfonate | 3 |
| Iodine | 1.6 |
| HI | 1.32 |
| Water | 53.88 |
| | 100.00 |

In preparing this formulation, the sodium polymethacrylate and sodium xylene sulfonate and citric acid are dissolved in that order in the required amount of water (excluding water introduced by the acid components). The iodine and HI, supplied as commercial hydriodic acid, are premixed in a separate container and then added with agitation to the initial solution. Then with continued agitation, the phosphoric acid, introduced as commercial phosphoric acid, is added slowly to form the finished product.

When utilizing this formulation for the cleaning and santizing of milking pipelines, the pipeline system is first thoroughly rinsed with water at about 100° F. and drained from the system. This is followed by circulating through the system for 20 to 30 minutes a solution of 1 oz. of the above formulations to 5 gals. of warm water (not over 120° F.), providing an initial iodine concentration of approximately 25 p.p.m. At the end of the circulating cycle, the cleaning solution is drained from the line.

For sanitizing only, as for example in a rinse of the equipment prior to milking, 1 oz. of the formulation is dissolved in 10 gals. of warm water (not over 120° F.), providing an iodine concentration of about 12.5 p.p.m. This solution is circulated through the line in a manner to provide a contact time of about 2 minutes.

When used as above described, no problems are encountered due to the foaming of the product. Furthermore, this product at the recommended use dilution passes the test identified as "Use Dilution Method—Official," on approved method "to determine the maximum dilution effective for practical disinfection "as set forth in AOAC, 9th edition, 1960, pages 65–66.

As a further indication of the extremely low foaming characteristics of this product, it was compared, at dilutions of 1 to 640 (1 oz. to 5 gal.) and at 25° C., using the "dynamic" foam test method herein described, with the following compositions considered by prior standards to be "low foaming."

(A)—Cleaning formulation: Percent
"Pluronic P65" _____ 1.69
"Igepal CO-210" _____ .16
Phosphoric acid (75%) _____ 16.0
Glycolic acid (70%) _____ 16.0
Water _____ 66.15

(B)—Cleaning and sanitizing formulation: Percent
"Pluronic P65" _____ 13.5
"Igepal CO-210" _____ 1.25
Iodine _____ 2.7
Phosphoric acid (75%) _____ 16.0
Glycolic acid (70%) _____ 16.0
Water _____ 50.55

NOTE.—"Pluronic P65" is an ethoxylated polyoxypropylene in which the polyoxypropylene base has a molecular weight of about 1750 and polyoxyethylene constitutes about 50% by weight of the product.
"Igepal CO-210" is a nonylphenol ethylene oxide condensate containing about 1.5 mols of ethylene oxide per mol of nonylphenol.

This comparison gave the following results.

Sampled tested: Foam volume, ml.
New formulation _____ 60
Formulation A _____ 185
Formulation B _____ 425 (overflowing cylinder)

When using the conventional "static" foam test method, it is difficult, if not impossible, to distinguish between the foaming character of these three materials. However, formulations A and B could not be used in pipeline milking equipment and similar C.I.P. equipment for reason of the excessive foam. Thus, the differences in foaming characteristics brought out by the "dynamic" foam test method are of primary significance.

Various changes and modifications in the compositions herein disclosed may occur to those skilled in the art, and to the extent that such changes and modifications are embraced by the appended claims, it is to be understood that they constitute part of our invention.

We claim:
1. A cleaning and sanitizing composition consisting essentially of 10 to 33 parts by weight of phosphoric acid, 2 to 12 parts of citric acid, 1.5 to 8 parts of sodium polymethacrylate having a molecular weight of 850 to 42,000, 1 to 6 parts of sodium xylene sulfonate, 0.5 to 3.0 parts of iodine, a source of iodide ($I^-$) selected from the group consisting of HI and alkali metal iodides in an amount equivalent to 0.5 to 3.0 parts of HI, and 84.5 to 35 parts of water, said composition being characterized as having a foam rating of less than 125 as determined by the herein described "dynamic" foam test method.

2. A cleaning and sanitizing composition as defined in claim 1 wherein the sodium polymethylacrylate has a molecular weight of about 20,000.

3. A cleaning and sanitizing composition consisting of approximately 30% by weight of phosphoric acid, 6% citric acid, 4.2% sodium polymethacrylate having a molecular weight of about 20,000, 3% sodium xylene sulfonate, 1.6% iodine, 1.32% HI, and water to 100%, said composition being characterized as having a foam rating of about 60 as determined by the herein described "dynamic" foam test method.

References Cited in the file of this patent
UNITED STATES PATENTS

| | | |
|---|---|---|
| 2,599,140 | Taub | June 3, 1952 |
| 2,710,792 | McDonald et al. | June 14, 1955 |
| 2,759,869 | Sutton et al. | Aug. 21, 1956 |
| 2,826,528 | Shelanski et al. | Mar. 11, 1958 |
| 2,977,278 | Shelanski et al. | Mar. 28, 1961 |
| 2,977,315 | Scheib et al. | Mar. 28, 1961 |

OTHER REFERENCES

"Iodine Tamed," Shelanski, Chemical Week, vol. 69, No. 25, December 22, 1951 (page 19).

"Surface Active Agents and Detergents," Schwartz et al., 1949, pages 116–121.